United States Patent
Sigmund et al.

(10) Patent No.: US 10,301,482 B2
(45) Date of Patent: May 28, 2019

(54) SUPEROLEOPHOBIC ALUMINA COATINGS

(71) Applicant: University of Florida Research Foundation, Inc., Gainesville, FL (US)

(72) Inventors: Wolfgang M. Sigmund, Gainesville, FL (US); Shu-Hau Hsu, Gainesville, FL (US); Ravi Kumar Vasudevan, Somerville, MA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 298 days.

(21) Appl. No.: 15/327,516

(22) PCT Filed: Jul. 24, 2015

(86) PCT No.: PCT/US2015/041996
§ 371 (c)(1),
(2) Date: Jan. 19, 2017

(87) PCT Pub. No.: WO2016/014946
PCT Pub. Date: Jan. 28, 2016

(65) Prior Publication Data
US 2017/0166757 A1  Jun. 15, 2017

Related U.S. Application Data

(60) Provisional application No. 62/029,158, filed on Jul. 25, 2014.

(51) Int. Cl.
*B05D 1/02* (2006.01)
*B05D 1/18* (2006.01)
(Continued)

(52) U.S. Cl.
CPC ............. *C09D 5/1681* (2013.01); *B05D 1/02* (2013.01); *B05D 1/18* (2013.01); *C01F 7/021* (2013.01);
(Continued)

(58) Field of Classification Search
CPC ... B05D 1/02; B05D 1/18; C01F 7/021; C01P 2004/64; C03C 17/009; C03C 17/25;
(Continued)

(56) References Cited

U.S. PATENT DOCUMENTS 6,008,285 A    12/1999  Kasemann et al.
8,349,442 B2   1/2013   Nakao et al.
(Continued)

FOREIGN PATENT DOCUMENTS

EP       2594343          9/2013
WO    WO 2003/080258    10/2003

OTHER PUBLICATIONS

Teisala, H., "Multifunctional Superhydrophobic Nanoparticle Coatings for Cellulose-based Substrates by Liquid Flame Spray," Thesis for the degree of Doctor of Science, Nov. 1, 2013, Tampere University of Technology, Tampere, Finland, pp. 1-154. (Year: 2013).*

(Continued)

*Primary Examiner* — Alexander M Weddle
(74) *Attorney, Agent, or Firm* — Timothy H. Van Dyke; Beusse, Wolter, Sanks & Maire PLLC

(57) ABSTRACT

A superhydrophobic surface can be formed by contacting an article with a suspension of fluorinated boehmite particles to leave a film of the fluorinated boehmite particles after removal of the suspending fluid. The film can be transparent or the film can be translucent or opaque. When the film is translucent or opaque, the film can render the surface superoleophobic.

15 Claims, 4 Drawing Sheets

(51) Int. Cl.

| | | |
|---|---|---|
| C01F 7/02 | (2006.01) | |
| C03C 17/25 | (2006.01) | |
| C09D 5/16 | (2006.01) | |
| C03C 17/00 | (2006.01) | |
| C09C 1/40 | (2006.01) | |
| C09D 1/00 | (2006.01) | |
| C09D 7/40 | (2018.01) | |
| C09D 7/62 | (2018.01) | |
| C08K 3/36 | (2006.01) | |

(52) U.S. Cl.
CPC ............ *C03C 17/009* (2013.01); *C03C 17/25* (2013.01); *C09C 1/407* (2013.01); *C09D 1/00* (2013.01); *C09D 5/1618* (2013.01); *C09D 7/62* (2018.01); *C09D 7/70* (2018.01); *C01P 2002/84* (2013.01); *C01P 2004/02* (2013.01); *C01P 2004/03* (2013.01); *C01P 2004/24* (2013.01); *C01P 2004/62* (2013.01); *C01P 2004/64* (2013.01); *C01P 2006/90* (2013.01); *C03C 2217/42* (2013.01); *C03C 2217/76* (2013.01); *C03C 2218/111* (2013.01); *C03C 2218/112* (2013.01); *C08K 3/36* (2013.01)

(58) Field of Classification Search
CPC ............ C03C 2217/42; C03C 2217/76; C03C 2218/111; C08K 3/36; C09C 1/407; C09D 1/00; C09D 5/1618; C09D 5/1681; C09D 7/62; C09D 7/70
USPC ...................................................... 427/421.1
See application file for complete search history.

(56) References Cited

U.S. PATENT DOCUMENTS

| | | |
|---|---|---|
| 2007/0110906 A1 | 5/2007 | Edelmann et al. |
| 2010/0330347 A1 | 12/2010 | Badyal et al. |
| 2011/0021098 A1 | 1/2011 | Tabellion et al. |
| 2012/0137433 A1 | 6/2012 | Snell et al. |
| 2013/0216820 A1 | 8/2013 | Riddle et al. |
| 2014/0147627 A1 | 5/2014 | Aizenberg et al. |

OTHER PUBLICATIONS

Fang, X. et al., "Formation of superhydrophobic boehmite film on glass substrate by Sol-Gel method," Front. Chem. Eng. China, 2009, pp. 97-101, vol. 3, No. 1. (Year: 2009).*

Fang, X. et al., "Formation of superhydrophobic boehmite film on glass substrate by Sol-Gel method," *Front. Chem. Eng. China*, 2009, pp. 97-101, vol. 3, No. 1.

Li, J. et al., "One-step process to fabrication of transparent superhydrophobic $SiO_2$ paper," *Applied Surface Science*, 2012, pp. 470-472, vol. 261.

Lin, T-S. et al., "Enhancement of water-repellance performance on functional coating by using the Taguchi method," *Surface & Coatings Technology*, 2006, pp. 5253-5258, vol. 200.

Mertaniemi, H. et al., "Functionalized porous microparticles of nanofibrillated cellulose for biomimetic hierarchically structured superhydrophobic surfaces," *RCS Advances*, 2012, pp. 2882-2886, vol. 2.

Ogihara, H. et al., "Simple Method for Preparing Superhydrophobic Paper: Spray-Deposited Hydrophobic Silica Nanoparticle Coatings Exhibit High Water-Repellency and Transparency," *Langmuir*, 2012, pp. 4605-4608, vol. 28.

Tang, K. et al., "Fabrication of super-hydrophobic and super-oleophilic boehmite membranes from anodic alumina oxide film via a two-phase thermal approach," *J. Mater Chem.*, 2006, pp. 1741-1745, vol. 16.

Teisala, H., "Multifunctional Superhydrophobic Nanoparticle Coatings for Cellulose-based Substrates by Liquid Flame Spray," Thesis for the degree of Doctor of Science, Nov. 1, 2013, Tampere University of Technology, Tampere, Finland, pp. 1-154.

Tuteja, A. et al., "Designing Superoleophobic Surfaces," *Science*, 2007, pp. 1618-1622, vol. 318, No. 5856.

Wang, H. et al., "One-step coating of fluoro-containing silica nanoparticles for universal generation of surface superhydrophobicity," *Chem. Commun.*, 2008, pp. 877-879.

Woodward, I. et al., "Super-hydrophobic Surfaces Produced by Plasma Fluorination of Polybutadiene Films," *Langmuir*, 2003, pp. 3432-3438, vol. 19.

Nakajima, A. et al., "Preparation of Transparent Superhydrophobic Boehmite and Silica Films by Sublimation of Aluminium Acetylacetonate," *Adv. Mater.*, 1999, pp. 1365-1368, vol. 11, No. 16.

* cited by examiner insulation, wetting and colouring. The elasticity and high aspect ratios of the fibres allow deformation under capillary forces, which cause mechanical damage[8], matting[5,9] self-assembly[10,11] or colour changes[12], with many industrial and ecological consequences. Attempts to understand these systems have mostly focused on the wetting of rigid fibres[13-17] or on elastocapillary effects in planar geometries[18] and on a fibre brush withdrawn from an infinite bath[19]. Here we consider the frequently encountered case of a liquid drop deposited on a flexible fibre array and show that flexibility, fibre geometry and drop volume are the crucial parameters that are necessary to understand the various observations referred to above. We identify the conditions required for a drop to remain compact with minimal spreading or to cause a pair of elastic fibres to coalesce. We find that there is a critical volume of liquid, and, hence, a critical drop size, above which this coalescence does not occur. We also identify a drop size that maximizes liquid capture. For both wetting and deformation of the substrates, we present rules that are deduced from the geometric and material properties of the fibres and the volume of the drop. These ideas are applicable to a wide range of fibrous materials, as we illustrate with examples for feathers, beetle tarsi, sprays and microfabricated systems.

FIG. 2

SUPEROLEOPHOBIC ALUMINA COATINGS

CROSS-REFERENCE TO RELATED APPLICATIONS

This application is the U.S. national stage application of International patent application No. PCT/US2015/041996, filed Jul. 24, 2015, which claims the benefit of U.S. Provisional Application Ser. No. 62/029,158, filed Jul. 25, 2014, the disclosures of which are hereby incorporated by reference in their entireties, including all figures, tables and drawings.

BACKGROUND OF INVENTION

Surface cleaning and repair of the surface of, for example, buildings, vehicles, and energy collection devices, are time-consuming and costly, and a surface with an inherent repellency of water, oil, and dirt can be a significant advantage. Surface wetting is governed by surface-energy parameters between the surface and the contacting liquid or solid surface. Where the sum of the free surface energies between materials components is very low, adhesion between these materials is weak. Hence, it is generally beneficial to lower the free surface energy of an edifice if one hopes to ignore its cleaning and repair. Non-stick materials, such as perfluorinated hydrocarbons have very low surface energies such that few materials adhere to Teflon®. The wetting of these low surface energy materials is reflected in the contact area that is observed between the surface of the low surface energy solid and a wetting material. The interactions between these materials generally result from van der Waals forces.

Nature diminishes the interaction of a surface of a solid and water without resorting to materials with surface energies as low as Teflon®. This is achieved by reducing the amount of the surface that contacts the water. For example, lotus leaves, cabbage leaves, and various fruits are covered by small wax bumps that reduce the van der Waals contact area presented to a water droplet that forms due to its high surface tension, which significantly reduces the adhesion of the droplets to the surface. These superhydrophobic textured surfaces display water contact angles that are in excess of 150° and display low sliding angles, which is the critical angle from horizontal of the inclined surface where a water droplet of a defined mass rolls off the inclined surface. This "Lotus effect" provides a self-cleaning surface, as contact water droplets adhere to dust particles and, to a much lesser degree, to some oils that are poorly adhered to the surface, which allows the "dirt" to be carried away as the water droplet rolls off the surface. Most oils are not readily removed from such hydrophobic surfaces as the enlarged surface area increases the effective van der Waals interface and the Lotus-effect surface does not repel oils that cannot interact more favorably with water than the textured surface.

Oil repellent surfaces are an engineering challenge because the surface tensions of oily liquids are usually in the range of 20-30 mN/m. Hence, the essential criterion, for having a surface with superoleophobicity, is to maintain oil drops in a Cassie-Baxter (CB) state, one where vapor pockets are trapped underneath the liquid. The CB state is dependent on the surface's structure and the surface energy of the material. If the structure and surface area are insufficient, the meta-stable energetic state is transformed into Wenzel state. The geometric features that allow this state have re-entrant structures, such as mushroom heads, micro-hoodoos, or horizontally aligned cylindrical rods. A re-entrant structure implies that a line drawn vertically, from the base solid surface through the geometric feature, must proceed through more than one solid interface of that feature.

To achieve surfaces that display high or superhydrophobicity and high or superoleophobicity, nanoparticles can be spray deposited to form the textured surface. For example, Lin et al., *Surf. Coat. Tech.*, 2006, 200, 5253-58, discloses the spraying of a dispersion of spherical $TiO_2$ or tetrapod-like ZnO nanoparticles with a fluorinated binder onto a substrate to achieve contact angles as high as 161.4° with water and the demonstration of oil repellency. Ogihara et al., *Langmuir* 2012, 28, 4605-8 discloses superhydrophobic paper by spraying a suspension of dodecylsilyl-functionalized silica nanoparticles in alcohol onto paper and achieved contact angles of up to 155° without a binder. Mertaniemi et al. *RSC Adv.*, 2012, 2, 2882-2886 discloses the spray deposition of tridecafluoro-1,1,2,2-tetrahydrooctyl)silyl-functionalized nanofibrillated cellulose microparticles in ethanol onto glass to yield a semi-transparent coating with a contact angle of 163° upon drying. Li et al., *Appl. Surf Sci.*, 2012, 261, 470-2 discloses superhydrophobic paper, prepared by spraying a suspension of octadecylsilyl-functionalized 50 nm silica nanoparticles on paper, where the transparent coating displayed a contact angle of 163°.

Although superhydrophobic and superoleophobic surfaces have been produced there remains a need for the formation of superhydrophobic surface for transparent substrates and methods of producing transparent superhydrophobic coatings. Such coatings can be useful for windows and other transparent devices, particularly those whose access for cleaning is difficult or dangerous. Furthermore, a simple method of depositing a superoleophobic coating to a surface is desirable.

BRIEF SUMMARY

A coating comprises fluorinated boehmite particles. The fluorinated boehmite particles are prepared by suspending boehmite particles in a fluorinated organo silane coupling agent comprising fluid. The coating can form a superhydrophobic film on a surface of an article by contacting the surface with the coating composition. After removal of the fluid of coating, the film can be of a thickness that is transparent to the eye and renders the surface superhydrophobic, or the coating can be applied such that a thick film results that is superoleophobic as well as superhydrophobic.

BRIEF DESCRIPTION OF DRAWINGS

FIG. 2 is a photograph of a portion of a document with an uncoated glass slide, top, and a fluorinated boehmite nanoparticles coated glass slide, bottom, according to an embodiment of the invention.

DETAILED DISCLOSURE

Figure 1:
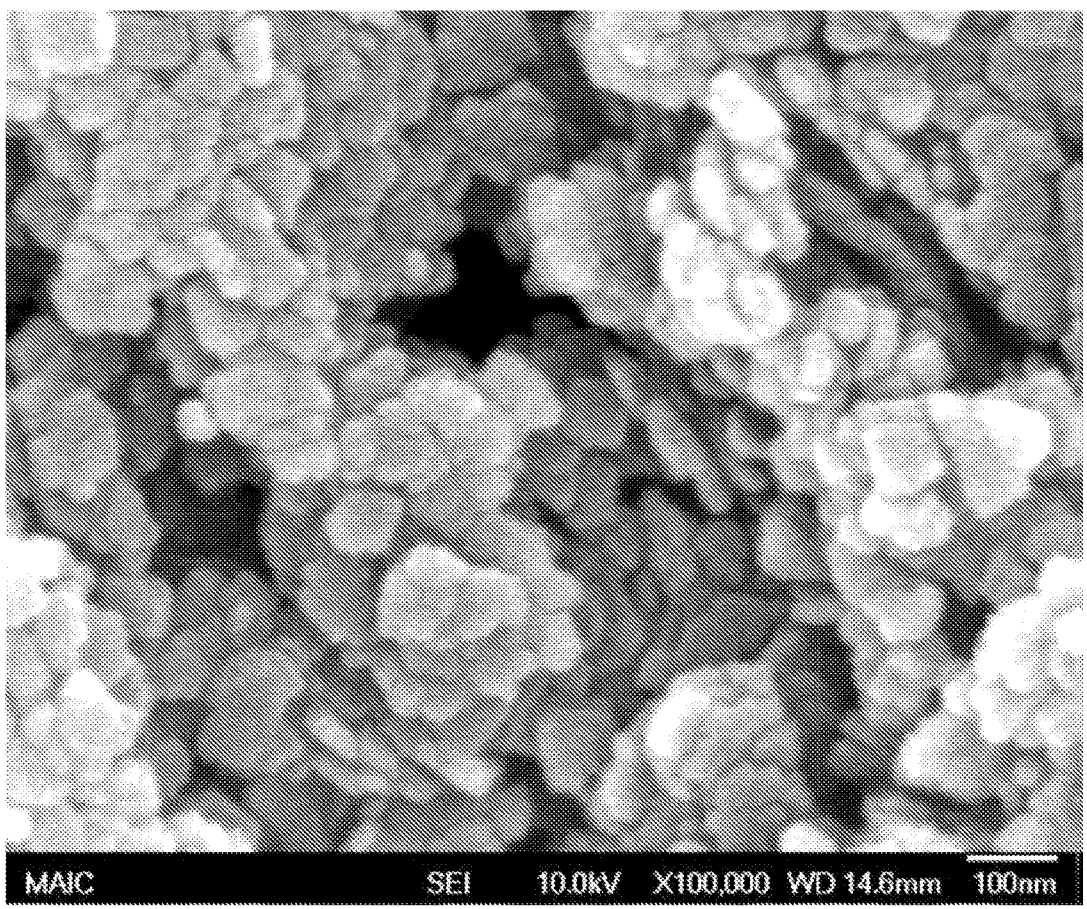
FIG. 1 is an SEM image of deposited fluorinated boehmite nanoparticles, where an irregular dispersion of nanoplatelets having a mean diameter of about 90 nm provides the textured surface including reentrant structures, according to an embodiment of the invention.

An embodiment of the invention is directed to the formation of a large area superhydrophobic and superoleophobic surface that results from a film deposited on any of a variety of substrates. The coating comprises boehmite nanoparticles that have been surface functionalized with fluoro organo silane moieties. Surfaces coated with a sufficiently thick film of these fluorinated boehmite particles display water and oil contact angles above 150 degrees with roll-off, or sliding, angles, the required tilt of the surface to cause drops to begin rolling on the surface, of only a few degrees from plane. Oil droplets roll from the coated surface without leaving a residue. Surfaces that are coated with the perfluoroalkyl functionalized nanoparticle films are easy to clean and can be used as a dirt-free paint or with oil separation membranes.

The coating is readily formed by contacting the surface of a substrate with the fluorinated boehmite nanoparticles. The contacting can be carried out by spraying the particulate suspension, applying with a doctor blade, or by any other direct bulk suspension contacting method. A very large surface area can be coated in this manner.

Advantageously, when the film of the fluorinated boehmite particles is relatively thin, the film displays superhydrophobic properties and allows a very high degree of transparency. Hence, a well-controlled spray coating allows for the preparation of glass articles that are superhydrophobic and transparent. Water dropped from a short height literally bounces off the coated surfaces leaving the surface dry. Such coated glasses can be used as water repellent windshields, easy-cleaning building windows, or easy-cleaning video displays.

Boehmite is an aluminum oxide hydroxide ($\gamma$-AlOOH) particle that containing a large number of hydroxyl groups on its surface that renders the surface hydrophilic. The boehmite nanoparticles are in the form of platelets, with platelet sizes that can range from about 10 nm to about 400 nm in cross-section. For example, platelets can be from 20 to 100 nm, 30 to 120 nm, 40 to 150 nm, or 50 to 120 nm. These boehmite platelets are surface functionalized by dispersing the platelets in a solution of a fluorinating agent, which reacts to form one or more bonds to the boehmite surface. The solution can employ an organic solvent compatible with the fluorinating agent, typically, but not necessarily, an aprotic solvent. The fluorinating agent is one that undergoes reaction with surface hydroxyl groups to form bonds that secure a perfluoroalkyl chain to the surface. The reaction can be catalyzed or uncatalyzed.

The fluorinating agent can be a fluorinated organosilane-coupling agent. Suitable agents have the structure: $R_n SiX_{(4-n)}$, where n is 1-3, X is independently a hydroxyl group or a hydrolysable group, and R is independently a non-hydrolysable group, wherein at least one R group is a fluorinated hydrocarbon group. When a hydrolyzable group, X can be H, Cl, Br, I, $C_1$-$C_6$ alkoxy, $C_6$-$C_{10}$ aryloxy, $C_1$-$C_6$ acyloxy, amino, $C_1$-$C_3$ alkylamino, $C_2$-$C_6$ dialkylamino, or any combination thereof. R is $C_1$-$C_6$ alkyl, phenyl, $C_2$-$C_5$ alkenyl, or $C_3$-$C_{20}$ organo group comprising a partially fluorinated or perfluorinated alkyl, cycloalkyl, aryl, or alkylaryl group that can be optionally interrupted one or more times with an oxygen atom. The fluorinated alkyl group can be linear, branched, hyperbranched or dendritic. Fluorinated alkyl group can be of the formula, $C_xF_{2x+1}CH_2CH_2$—, such as, but not limited to, $CF_3CH_2CH_2$—, $C_2F_5CH_2CH_2$—, n-$C_6F_{13}CH_2CH_2$—, i-$C_3F_7OCH_2CH_2CH_2$—, n-$C_8F_{17}CH_2CH_2$—, and n-$C_{10}F_{21}CH_2CH_2$— where x is 1 to 30. The functionalization of the boehmite can be carried out with rapid agitation, sonication, or any manner which promotes the presentation of the platelet surface to fluorinating agent. Any excess of the fluorinating agent can be used and the functionalized boehmite nanoplatelets can be washed prior to deposition to remove any excess fluorinating agent, or the excess fluorinating agent can be retained through the deposition on the substrate.

The dispersion can be carried out with shearing of agglomerates of the platelets. The dispersion can be made in a fluid that is unreactive with the fluorinating agent. For example, the boehmite can be dispersed in a polar aprotic solvent, such as, but not limited to chloroform, methylene chloride, tetrahydrofuran, dimethylformamide, dimethylsulfoxide, bromoform, or any other solvent or mixed solvent. Shear can be provided by sonication, rapid stirring, or any other means where particles are not ground. The fluorinating agent can be present in the solvent before adding the boehmite nanoparticles or added after the particles have been suspended. The fluorinated boehmite nanoparticles can be isolated prior to deposition on a substrate, by filtration or other separation technique. After isolation, the fluorinated boehmite particles can be resuspended in a solvent. The solvent can be any solvent, including, but not limited to, a fluorinated solvent that facilitates dispersion of the fluorinated nanoparticles in suspension.

After deposition on the substrate, the fluid is removed; for example, a solvent is evaporated, and the fluorinated boehmite nanoparticles reside as a film that has effective reentrant structures resulting from the random settling of the platelets on the surface. An exemplary fluorinated boehmite nanoplatelet film of 90 nm in cross-section particles is shown in FIG. 1. The fluorinated boehmite nanoplatelet film provides a surface that can be deposited on most substrate materials, including, but not limited to, glass, ceramic, metal, paper, wood, thermoplastic, or thermoset.

Methods and Materials

Fluorinated boehmite nanoparticles were prepared by contacting boehmite nanoparticles with a solution of a fluorinated organo silane coupling agent. The boehmite particles (CAM 9080, Saint Gobain Inc.) were dispersed in chloroform by sonication with a horn sonicator at 65 W at 20 KHz. Surface functionalization was carried out by adding heptadecafluoro-1,1,2,2-tetrahydrodecyl trichlorosilane (FTCS) to the suspension. FTCS was at a concentration of 0.01M in the suspension. The FTCS and boehmite suspension were maintained for more than 15 hours. The fluorinated boehmite particles were rinsed by chloroform and dried in the oven. The fluorinated boehmite was dispersed in hydrofluoroether solvent (3M HFE-7200, a mixture of ethyl nonafluoroisobutyl ether and ethyl nonafluorobutyl ether) with fluorinated boehmite concentrations of 2%. Coatings were applied by spraying the dispersion on a substrate using an airbrush, typically with coverage of about 2×2 square inch with about 1 ml of dispersion.

Figure 3:
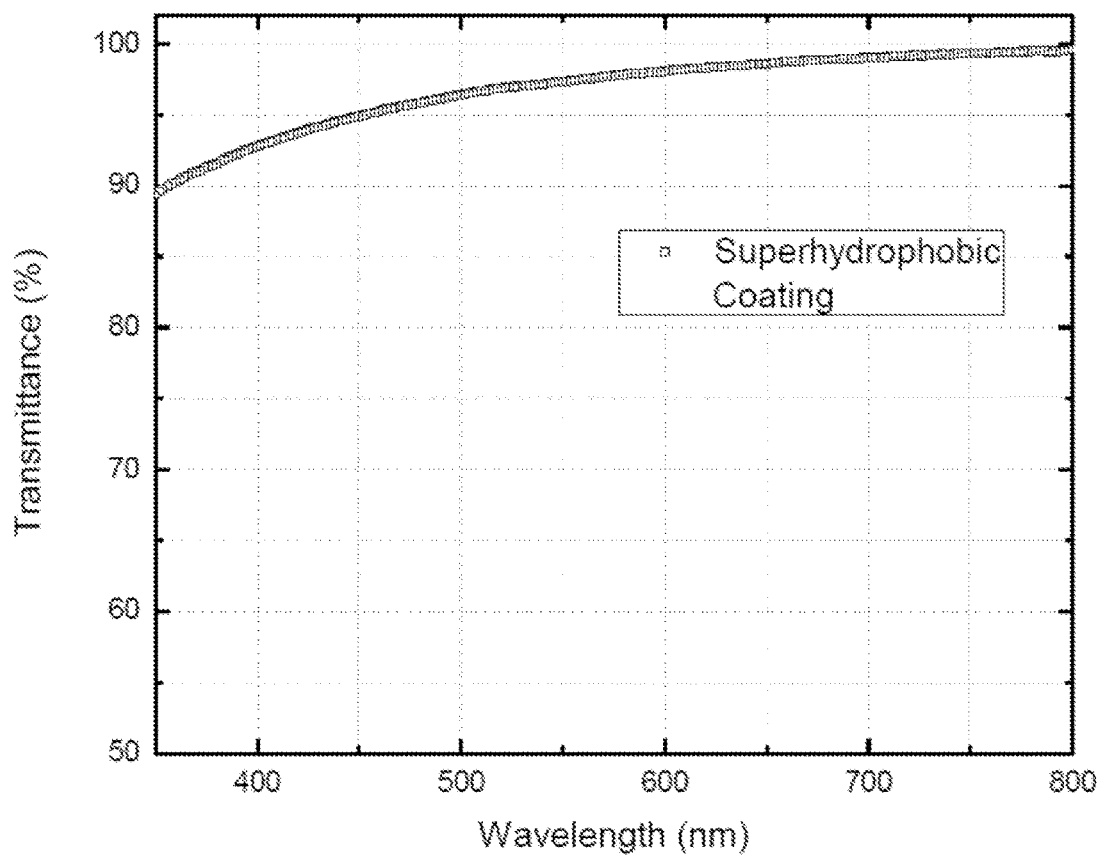
FIG. 3 is a plot of percent transmission over the visible spectrum for the fluorinated boehmite nanoparticles coated glass slide of FIG. 2, according to an embodiment of the invention.
Figure 4:
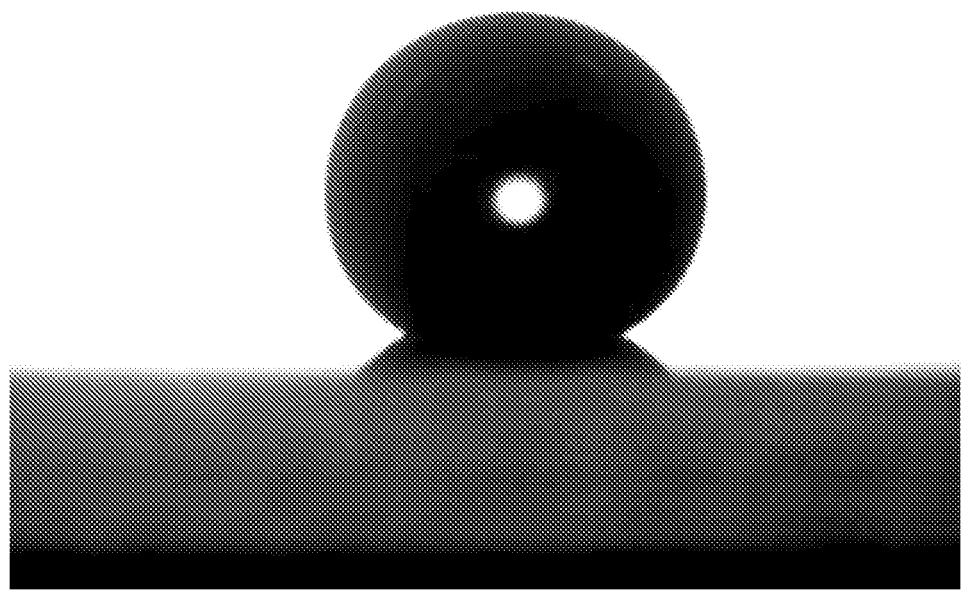
FIG. 4 is a magnified photographic image of a water drop residing on the boehmite nanoparticles coated glass slide of FIG. 2, according to an embodiment of the invention.

A portion of the fluorinated ether suspension of the fluorinated boehmite nanoparticles was sprayed on a glass slide to form a thin film. After evaporation of the fluorinated ether solvent, as shown in FIG. 2, a reference uncoated slide, top, and a coated slide, bottom, displayed almost no difference in transparency to the naked eye. The coated slide displays at least 90% transmittance through the entire visible spectrum, as shown in FIG. 3. A drop of water placed on the 2×2 square inch deposition of the fluorinated boehmite nanoparticles on the glass slide, displays a contact angle of 148°, as illustrated in FIG. 4.

Another portion of the fluorinated ether suspension of the fluorinated boehmite nanoparticles was sprayed on a metal mesh to form a thick coating. The thick coating has a haze and is not transparent. However, deposition of an olive oil drop (γ~33 mN/m) readily rolled on the coated metal mesh without leaving any residue on the surface of the mesh, clearly displaying superoleophobicity.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A coating composition, comprising fluorinated boehmite nanoplatelets, wherein a multiplicity of fluorinated moieties are bound to plurality of boehmite nanoplatelets.

2. The coating composition according to claim 1, wherein the boehmite nanoplatelets are 10 to 400 nm in cross-section.

3. The coating composition according to claim 1, wherein the fluorinated moieties comprise a fluorinated organosilane.

4. The coating composition according to claim 3, wherein the fluorinated organosilane comprises a fluorinated hydrocarbon group.

5. The coating composition according to claim 3, wherein the fluorinated organosilane comprises $C_xF_{2x+1}CH_2CH_2$—, where x is 1 to 30.

6. The coating composition according to claim 1, further comprising a solvent.

7. A method of preparing a coating composition according to claim 1, comprising:
   providing a plurality of boehmite nanoparticles;
   providing a fluorinated organosilane coupling agent;
   dispersing the boehmite nanoparticles in a fluid comprising a first solvent the fluorinated organosilane coupling agent wherein fluorinated boehmite nanoplatelets form;
   optionally, isolating the fluorinated boehmite nanoplatelets, and
   optionally, suspending the fluorinated boehmite nanoplatelets in a second solvent.

8. The method according to claim 7, wherein the fluorinated organosilane coupling agent comprises $R_nSiX_{(4-n)}$, where n is 1-3; X is independently, hydroxyl, H, Cl, Br, I, $C_1$-$C_6$ alkoxy, $C_6$-$C_{10}$ aryloxy, $C_1$-$C_6$ acyloxy, amino, $C_1$-$C_3$ alkylamino, $C_2$-$C_6$ dialkylamino, or any combination thereof; R is independently $C_1$-$C_6$ alkyl, phenyl, $C_2$-$C_5$ alkenyl, or partially fluorinated or perfluorinated organo group; wherein the fluorinated or perfluorinated organo group is a $C_3$-$C_{32}$ alkyl, cycloalkyl, aryl, or alkylaryl group, optionally interrupted one or more times with an oxygen atom; wherein at least one of the R groups is the fluorinated or perfluorinated organo group.

9. The method according to claim 7, wherein the fluorinated organosilane coupling agent is heptadecafluoro-1,1,2,2-tetrahydrodecyl trichlorosilane (FTCS).

10. The method according to claim 7, wherein the first solvent is an aprotic organic solvent.

11. The method according to claim 7, wherein the second solvent is a fluorinated solvent.

12. A method for preparing an article comprising a superhydrophobic surface, comprising:
    providing a coating according to claim 1 in the form of a suspension in a fluid;
    providing an article comprising a surface;
    contacting the coating with the surface; and
    removing the fluid, wherein a superhydrophobic film resides on the surface.

13. The method of claim 12, wherein the film is of a thickness that the film is transparent when judged by eye.

14. The method of claim 12, wherein the film is of a thickness that the film is translucent or opaque when judged by eye, wherein the article comprising a superhydrophobic surface is a superoleophobic surface.

15. The method of claim 12, wherein contacting comprises spraying or spreading of the suspension onto the surface, or dipping the article into the suspension.

* * * * *